United States Patent [19]
Byrne et al.

[11] 3,908,061
[45] Sept. 23, 1975

[54] COMPOSITE MATERIALS COMPRISING RESIN MATRIX AND CARBON FIBERS

[75] Inventors: Joseph B. Byrne, Antioch, Calif.; Harvey D. Ledbetter, Midland, Mich.

[73] Assignee: The Dow Chemical Company, Midland, Mich.

[22] Filed: Oct. 16, 1974

[21] Appl. No.: 515,138

Related U.S. Application Data

[63] Continuation-in-part of Ser. No. 233,751, March 10, 1972, Pat. No. 3,853,610.

[52] U.S. Cl. ............... 428/288; 428/368; 428/373; 260/37 EP; 260/40 R; 260/42.14; 260/42.29; 260/42.52
[51] Int. Cl.² .. B32B 5/22; C04B 35/52; C08K 9/04; C08L 67/06
[58] Field of Search... 17/46 CB, 46 CC, 72, 16.12 B, 117/226, 228; 260/40 R, 37 EP, 42.14, 42.29, 42.52; 161/170, 176

[56] References Cited
UNITED STATES PATENTS

| | | | |
|---|---|---|---|
| 3,407,038 | 10/1968 | Beasley | 161/170 X |
| 3,720,575 | 3/1973 | Cowland | 161/170 |
| 3,790,393 | 2/1974 | Cowland et al. | 161/170 X |
| 3,825,517 | 7/1972 | Ficarra | 260/40 R |
| 3,837,904 | 9/1974 | Hill | 117/161 ZB |

*Primary Examiner*—Donald E. Czaja
*Assistant Examiner*—S. M. Person
*Attorney, Agent, or Firm*—Ronald G. Brookens

[57] ABSTRACT

This invention is directed to strongly bonded composite materials and a process for preparing the same, such materials comprising (1) a resinous matrix containing (2) carbon fibers having a Young's modulus parallel to the fiber axis of at least about $12 \times 10^6$ pounds per square inch and having a substantially continuous coating of amorphous carbon applied to the surface of such fibers prior to admixture with the resin matrix.

2 Claims, No Drawings

COMPOSITE MATERIALS COMPRISING RESIN MATRIX AND CARBON FIBERS

CROSS-REFERENCE TO RELATED APPLICATION

This application is a continuation-in-part of copending application Ser. No. 233,751, filed Mar. 10, 1972 now U.S. Pat. No. 3,853,610.

BACKGROUND OF THE INVENTION

Carbon fibers having a Young's modulus parallel to the fiber axis of at least about $12 \times 10^6$ pounds per square inch are weakly bonded at the surface with resinous materials such as epoxy resins, vinyl ester resins and polyester resins. Because of this, resin composites containing such fibers fail prematurely when subjected to applied force. Failure occurs in shear due to debonding of resin from the fiber surface. Composites containing relatively low modulus amorphous type carbon fibers, however, have higher values of interlaminar shear strength because of superior interfacial bonding.

The greater bonding ability of low modulus carbon fibers is believed to be due to the isotropic character of their surfaces. Fundamental structural units of these carbons are small and have a layered structure similar to that of graphite, but to a major extent are randomly disposed relative to each other. For these reasons a large proportion of the fiber surface will consist of exposed layer edges of the fundamental particles uniformly distributed over the surface. Exposed edges are believed to be highly reactive, may possess polar adducts, and may even bond chemically with epoxy resins.

Higher modulus carbon fibers are more ordered due to the occurrence of particle growth, partial graphitization, and orientation of crystallites during manufacture. The surface is generally anisotropic, consisting of relatively large areas of exposed crystallite basal planes and lessened exposure of edges. Crystallite basal planes are believed to have low reactivity and to bond only poorly with resins.

Prior efforts to improve the shear properties of carbon fibers have involved the following approaches:

A. Coat the fiber surface with a silane or amine type coupling agent.

(Steingiser, Samuel, and R. A. Cass; "Graphite Fiber Reinforced Composites." Technical Report AFML-TR-68-357, Part I, November, 1968;

Herrick, John W.; "Resin-Fiber Interactions in Graphite Fiber Epoxy Composites," 23rd Annual Technical Conference, 1968 Reinforced Plastics/Composites Division, The Society of The Plastics Industry, Inc., Section 16A, pp. 1–8;

Prosen, S. P., J. V. Duffy, P. W. Erickson and M. A. Kinna; 21st Annual Technical Conference, 1966 Reinforced Plastics/Composites Division, The Society of The Plastics Industry, Inc., Section D; and Harris, B., D. W. P. Beaumont, A. Rosen; J. of Materials Science, 4, 432–438 (1969)).

B. Grow silicon carbide whiskers on the fiber surface in a direction perpendicular to the fiber axis.

(Simon, R. A., and S. P. Prosen, "Graphite Fiber Composites; Shear Strength and Other Properties," 23rd Annual Technical Conference, 1968 Reinforced Plastics Composites Division, The Society of The Plastics Industry, Inc., Section 16B, pp. 1–10).

C. Treat the fiber at boiling temperature with an aqueous solution of an oxidizing agent.

(Prosen, S. P., J. V. Duffy, P. W. Erickson and M. A. Kinna; 21st Annual Technical Conference, 1966 Reinforced Plastics/Composites Division, The Society of The Plastics Industry, Inc., Section D).

D. Treat the fibers in air for a prolonged period at temperatures up to 1,000°C.

(U.S. Pat. No. 3,476,703).

E. Contact heated carbon filament with a $BCl_3$ - toluene mixture in the vapor phase.

(Quackenbush, N. E., et al., "Development of Surface Treatments for High-Modulus Graphite Fibers," Aeronutronic Publications on Contract No. N00019-70-C-0301 Dept. of Navy, Naval Air Systems Command, September, 1970).

F. Deposit a metal salt or metal complex from solution and decompose at high temperature, and G. Form a coating of carbon on the fiber surface.

(Larsen, J. V., "Surface Treatments and Their Effects on Graphite Fibers." Paper presented at 161st Meeting, A.C.S., Lost Angeles, March 29–May 2, 1971. Preprints, page 428, Division of Organic Coatings and Plastics Chemistry).

Method A, treatment with coupling agents, has generally not been successful. Growth of SiC whiskers on carbon fibers in Method B is accomplished by exposing the fibers to a source of silicon and carbon at 1,100°–1,650°C. Treated fibers resemble a foxtail, the whiskers protruding from the fibers in all directions around the fiber. Considerable care must be exercised during the whiskerizing process to avoid degrading fiber tensile strength. The presence of whiskers attached to the surface also precludes close approach of fibers to each other. The high fiber concentrations attainable in a composite with nonwhiskered fibers is not possible with whiskerized fibers.

Oxidizing agents used in Method C have included nitric acid, sodium hypochlorite, and acidic potassium permanganate. Significant surface activation is obtained with nitric acid; however, reaction times with refluxing nitric acid ranging from 24 to 48 hours are necessary.

In Method D, carbon fibers were heated in air at temperatures of 550°C. and 600°C. for periods ranging up to four hours. Fiber weight losses as high as 3.56 percent result with fibers having a pitted surface obtained simultaneously with this weight loss.

In Method E, vapor phase treatment with $BCl_3$ and toluene, yields fibers with improved shear strength compared to untreated fibers, but with the deposition of both boron and carbon on the fiber surface.

In Method F, ferric chloride, ferrocene, and a chromium complex was deposited on carbon fibers and then decomposed at high temperatures. Improved fiber shear strength was achieved in each case, but fiber tensile strength decreased after treatment with ferric chloride.

The Method G, deposition of carbon on the fiber surface, is similar to the present invention. The investigator in this case, J. V. Larsen, used two methods to deposit carbon on the fiber surface. In one method, he heated carbon fibers by electrical resistance to 1,200°C., and then contacted the hot fibers with a mixture of methane and nitrogen. The methane decomposed on the hot fibers forming a carbon coating on their surfaces. Larsen discloses that a two-fold increase in shear strength over untreated fibers was obtained with this treatment. Some loss of fiber tensile strength was also observed.

In the second method, carbon fibers are impregnated with a solution of a phenylated polyquinoxaline. The fibers were dried and then brought to an unspecified high temperature up to 1,600°C. by electrical resistance heating. It is stated that composite shear strength of these fibers improved by a factor of 2.7 over untreated fibers.

Coating carbon fibers with carbon by the pyrolysis of methane is also described in British Pat. No. 1,122,645 where the coating is formed between 1,800°C. and 2,300°C. X-ray diffraction patterns of pyrolytic carbons deposited from methane at temperatures of 1,600°C., 1,850°C. and 2150°C. (as reported by Blackman, Saunders and Ubbelohde in Proc. Royal Soc., 264A, 19 (1961)) show the progression of crystalline order and preferred orientation in these carbons with deposition temperature.

Carbon deposited at 1,600°C. is essentially isotropic, although a slight degree of preferred orientation is detected in the X-ray patterns. The 1,850°C. carbon shows marked anisotropy with some misorientation of crystallite basal planes. Carbons obtained at 2,150°C. show preferred orientation of crystallites and an advanced degree of graphitization. Thus, crystallite orientation and the process of graphitization is beginning at deposition temperatures greater than 1,600°C. Density and interlayer spacing data from the same reference indicate such changes in structure beginning at 1,700°–1,750°C. Marked changes in properties occur at an apparent critical deposition temperature of 1,900°C.

SUMMARY OF THE INVENTION

The present invention is directed to a means of obtaining strongly bonded composite materials by a process comprising preparation of a resinous matrix containing carbon fibers having a Young's modulus parallel to the fiber axis of at least about $12 \times 10^6$ pounds per square inch and having a substantially continuous coating of amorphous carbon (as determined by electron diffraction) applied to the surface of such fiber prior to admixture with the resin matrix. More specifically, it comprises deposition on such fibers of a thermally carbonizable organic precursor material followed by pyrolyzing such precursor at temperatures below 1,200°C., and preferably within such pyrolysis takes place in a nitrogen atmosphere containing from about 900 ppm to about 3,200 ppm of oxygen.

It has been discovered, which discovery forms part of the present invention, that utilization of such process provides improved interfacial shear strength in a resin matrix, e.g., an epoxy resin, vinyl ester resin or polyester resin, particularly when the amorphous carbon coating is derived from materials such as polyvinylidene chloride, polyacrylonitrile or polyvinyl chloride. It has also been discovered that the amorphous coating produced on the carbon fibers utilized in the present invention has significant utility as a sizing agent, i.e., carbon fiber tow coated with amorphous carbon has a much smaller bulk diameter than uncoated tow. This occurs because fibers in the tow are initially drawn closely together through the surface tension of the coating solution. Fibers are held in close proximity by subsequent formation of occasional carbon bridges and areas of adhesion between individual fibers. Because of the close proximity of fibers and the bridges between them, tows containing carbon coated fibers are stiffer than tows with uncoated fibers. The degree of stiffness can be controlled since stiffness depends on the amount of carbon deposited. Tow containing carbon coated fibers are also more easily handled and suffers less snagging and snarling of fibers than tow with uncoated fibers.

The amorphous carbon coating, as described herein, is one in which the crystallite basal planes of the coating must be substantially random with respect to the surface. An amorphous coating will show no orientation in an electron diffraction pattern using 50KV electrons when deposited to a uniform thickness of 150A or more. Thin amorphous coatings may be difficult to characterize because of reflections from fundamental particles of the underlying carbon fiber. For this reason the test for amorphous character of the carbon coating requires a coating sufficiently thick to obscure reflections from the underlying structure.

DESCRIPTION OF PREFERRED EMBODIMENTS

The carbon fibers which are utilizable in the present invention may be any such fiber having a Young's modulus parallel to the fiber axis of at least about $12 \times 10^6$ pounds per square inch. Exemplary of polyacrylonitrile fibers are those disclosed in British Pat. No. 1,170,591 and U.S. Pat. No. 3,412,062. Carbon fibers derived from rayon, pitch (either from hydrocarbon or wood), phenolic resins, epoxy resins, rayon and saran may also be used.

The carbonizable organic precursor materials contemplated by the present invention include any material capable of forming solutions in a volatilizable solvent and which form an amorphous carbon coating on the carbon fibers when pyrolyzed at temperatures below 1200°C. Exemplary of preferred carbonizable materials are polyvinylidene chloride, polyacrylonitrile and polyvinylchloride, asphalt, cured epoxy resins, petroleum pitch, phenolic resins, polyimide resins and polybenzimidazol resins, among others. Preferred volatilizable solvents are hexamethylphosphoramide (when using polyvinylidene chloride as the carbonizable organic precursor); dimethylformamide (when using polyacrylonitrile as the organic precursor) and methyl ethyl ketone (when using polyvinylchloride as the organic precursor).

Important process variables of this invention include: molecular weights of the carbonizable organic precursor; concentration of precursor in the solvent used, maximum heating temperature; and dwell time at maximum temperature.

Molecular weight of precursor and its concentration in the solvent are important variables in that they affect the amount of precursor material picked up by the carbon fiber strand. This in turn affects stiffness of the strand and associated strand processability. Carbon fiber tow has been satisfactorily coated with carbon after impregnation with a solution containing 1.25 gpl polyvinylidene chloride in hexamethylphosphoramide. Coated tow with satisfactory properties may be obtained by impregnating with a solution containing as low as 0.5 gpl precursor. Generally, precursor concentrations in the impregnating solution ranging from 0.5 to 50 gpl may be used. This will give carbon coatings on the carbon fibers of a few A to 300A or more thickness. It is possible to modify the process such that coatings up to 10,000A or more are deposited. Preferred precursor concentrations are 1 gpl to 10 gpl with subsequent coatings, 20A to 200A thickness.

The range of precursor concentration may have to be modified with different precursor-solvent systems. The optimum precursor concentration can easily be determined with a few experiments.

It has also been discovered, which discovery represents part of the present invention, that improved results are obtained by pyrolyzing the carbonizable organic precursor in a nitrogen or other inert atmosphere containing relatively small amounts of oxygen. In this regard, an oxygen concentration in the nitrogen atmosphere of approximately 900 ppm is necessary to obtain activated fibers having optimum shear properties. Such fibers are also obtained even when activated at oxygen concentrations as high as 3,200 ppm. However, some loss of fiber tensile strength occurs at this oxygen concentration. It is thus preferable to operate with an oxygen concentration of about 1,000 ppm.

A flow of nitrogen is maintained into the hot tube through which the carbon fibers are drawn for surface activation. Since the tube is partially open at both ends, the nitrogen flow must be sufficiently high to prevent back diffusion of air into the tube. Flow rates of about 2,000 ml/min. are generally sufficient. This represents a tube volume turnover of 7½ times per minute.

The temperatures used for pyrolyzation of the carbonizable organic precursors are those temperatures less than 1,200°C. and preferably temperatures between about 900°C. and 1,100°C.

Fiber dwell time at maximum temperature was usually adjusted to approximately 15 minutes. Longer dwell times up to 30 minutes did not significantly alter fiber shear properties. The shortest possible dwell time may be dependent on prior heating temperatures.

The experiments specifically set forth hereinafter were carried out at final carbonization temperatures of from 915°C. to 950°C. (Temperature of the last heater in the heating system.) Fiber dwell time at these temperatures ranged from 13 to 21 minutes. These times are probably longer than necessary for the carbonization temperatures used. Shortest possible time will be process dependent, i.e., it will depend on the temperatures at which preceding heaters in the carbonization equipment are held. It is believed that optimum dwell time at final temperature of 915°C. to 950°C. may be as low as 1 to 5 minutes.

The final carbonization temperature may be reduced to approximately 500°C. using a polyvinylidene chloride precursor. (See Example I).

Carbonization of polyacrylonitrile in the neighborhood of 700°C. (in the presence of oxygen) is nearly complete, provided that the polymer is preheated in an oxidizing atmosphere. Optimum fiber dwell time at lower carbonization temperatures will of course be longer. Optimum dwell time can be easily determined experimentally.

Carbon fibers coated with amorphous carbon are advantageously used with epoxy resin or other resins such as vinyl ester resins and polyester resins to improve mechanical properties of the resin. The amorphous carbon coating will improve handling characteristics of the fiber, and will protect them from damage through snagging with equipment or with other fibers.

The following nonlimiting examples are set forth to more specifically describe and illustrate the present invention:

Materials used in the following examples were as follows: carbon fibers, polyvinylidene chloride, hexamethylphosphoramide, polyacrylonitrile, dimethylformamide, polyvinylchloride, methyl ethyl ketone and nitrogen, cured epoxy resins, vinyl ester resins, polyester resins and asphalt. When polyvinylidene chloride was used as a carbon precursor, hexamethylphosphoramide was used as solvent. With polyacrylonitrile as precursor, dimethylformamide was used as solvent. Methyl ethyl ketone was used as solvent for polyvinylchloride.

The carbon fibers had the following properties:

| Fiber Type | Filament Diameter Microns | Average Density Lbs./Cu. Ft. | Ultimate Tensile Strength, $\times 10^{-6}$ psi | Mod. of Elast., $\times 10^{-6}$ psi |
|---|---|---|---|---|
| HM | 8.3±.35 | 0.0693 | 250–350 | 50–60 |
| HT | 8.6±.45 | 0.0635 | 300–400 | 32–40 |

These fibers were manufactured from a polyacrylonitrile starting material. HM type fibers were graphitized at 2,300°C. HT type fibers were processed to a maximum temperature of 1,500°C.

Hexamethylphosphoramide, used as a solvent for polyvinylidene chloride, was a commercial product and was used as supplied.

Polyacrylonitrile molecular weight from viscosity measurement was 312,000. Reagent grade dimethylformamide was used as solvent for polyacrylonitrile.

Nitrogen was "pre-purified grade" guaranteed by the supplier to contain less than 5 ppm $O_2$ and to consist of 99.99 percent $N_2$.

The epoxy resin system used for the preparation of composites was ERL 2256 with ZZL 0820 hardener. Resin to hardener ratio was 100/37 parts by weight. Epoxy composites stood overnight at ambient temperature. They were cured 2 hours at 82°C. and 2 hours at 148°C.

ERL 2256 is a mixture containing 62.5 percent diglycidyl ether of Bisphenol A and 37.5 percent bis(2,3-epoxycyclopentyl) ether. ZZL 0820 is an eutectic mixture of m-phenylenediamine and methylenedianiline.

EXAMPLE I

Four 9-inch lengths of graphitized carbon fiber tow (HM type) were attached at their ends to an elongated "dumb-bell" like holder fabricated from graphite rod. A solution containing 10 gpl of polyvinylidene chloride (PVDC) in hexamethylphosphoramide (HMPA) was applied to the lengths of tow with a medicine dropper. Excess solution was wiped away with tissue paper. The tow was heated according to the following schedule:

| Temp. °C. | Time, Minutes | Atmosphere |
|---|---|---|
| 139 | 70 | Air |
| 179–200 | 60 | $N_2$ |
| 430–450 | 61 | $N_2$ |
| 530–550 | 78 | $N_2$ |

Six test strips each containing a single length of treated tow encapsulated in an excess of epoxy resin were fabricated. Dimensions of the test strip were 0.015 inch × 0.5 inch × 5 inches. They were fabricated between two sheets of polyethyleneterephthalate with suitable spacers to control width and thickness. The cured test strips were broken in tension with an Instron Testing Machine at a crosshead speed of 0.2 inch/minute. Fibers protruding from the broken end of a test strip were brought into focus at 400x with an optical microscope. The protruding lengths of 130–160 fibers from ten broken ends were measured at random by means of a calibrated scale in the eyepiece. A total of 1426 measurements were made. The average protruding or "pull-out" length from these measurements was $19 \times 10^{-4}$ inches. Interfacial shear strength was calculated from the equation[1]:

$$\tau = \frac{\sigma d}{4 l}$$

$\tau$ = shear strength; $d$ = fiber diameter; $\sigma$ = fiber tensile strength; $l$ = average fiber "pull-out" length.

Interfacial shear strength determined from these measurements was 11,560 psi. Interfacial shear strength with untreated fibers determined by the same method was 7,580 psi.

EXAMPLE II

Graphitized carbon fibers (HM type) were processed in a separate experiment. This was accomplished by passing the carbon fiber consecutively from a fiber feed roll (A), over a "pigtail" fiber guide (B), into an impregnating batch (C), then between a pair of infra-red lamps (D), between cylindrical heating units (1), over guide roll (F), between a second pair of cylindrical heating units (2), over guide rolls (G), (H) and (I), between other cylindrical heating units (3), (4) and (5) (arranged in series), under a nitrogen inlet tube (J) and onto a take-up roll (K). In such process, carbon fiber is fed through a solution of carbonizable organic precursor at (C), the solvent is evaporated in air by passage of the fiber through the infra-red lamps (D) and heating units 1 and 2. The fiber then travels through the heating units (3), (4) and (5) where carbonization of the organic precursor occurs.

Three runs were made wherein the concentrations of polyvinylidene chloride in hexamethylphosphoramide at (C) were respectively 1.25 gpl, 5 gpl, and 10 gpl. Fiber travel rate was held between 7.6 and 9.4 ft./hr. Prepurified nitrogen was fed into the system. Temperatures of the ovens were as follows: 1, 67°–72°C.; 2, 145°–154°C.; 3, 180°C.; 4, 400°C.; 5, 935°–940°C.

The tow obtained was in all cases of reduced bulk diameter and stiffer than the original untreated tow. Visible comparison of the tows shows that two stiffness and reduction of bulk diameter becomes greater as one increases the concentration of polyvinylidene chloride in the impregnating solution. The two obtained could also in all cases be freely handled, and was less subject to snagging and snarling than untreated tow.

Epoxy resin composites were fabricated with fibers from each of the runs, and also with the original untreated fibers. Interlaminar shear strength of each composite was measured by the short beam method. The results from these measurements at 60 percent by volume ($V$) graphitized fibers are reported below in Table I. Tensile strength of the fibers is also reported in Table I.

TABLE I

| PVDC Conc. gpl | I.L.S.S.[1] psi | Fiber Tensile Strength[2] psi × $10^{-3}$ |
|---|---|---|
| 0 | 6260 | 269 |
| 1.25 | 7320 | 307 |
| 5.0 | 7600 | 324 |
| 10.0 | 6980 | 312 |

1. Interlaminar Shear Strength (I.L.S.S.)

A composite test bar is fabricated by laying resin impregnated tow into a rectangular, open-ended mold. Excess resin is forced out through the open ends by application of pressure to a rectangular piston-like bar inserted in the mold. Thickness of the test bar is set by shoulders on the pressure application bar which act as stops to movement. Dimensions of the test bar were 0.13 inch × 0.25 inch × 7 inches. The bar was cut into test pieces, 0.635 inch in length, for measurement of interlaminar shear strength. Test method used is ASTM-D 2344-67. Span to depth ratio was slightly less than 4:1.

The bars were fabricated to contain 60 percent by volume parallel fibers. Actual fiber content was determined analytically by digestion of a portion of the bar with nitric acid. Density was calculated from the dimensions of each test bar and its mass in air.

2. Measurement of Fiber Tensile Strength

The method used is a single fiber evaluation method. It is described in the following Air Force Report.

Evaluation Technique for Fibers and Yarns. Used by Fibrous Materials Branch, Non-metallic Materials Branch, Air Force Materials Laboratory. AFML-TR-67-159, Fibrous Materials Branch, September, 1967.

The data show that epoxy resin composites containing carbon coated graphitic fibers have improved interlaminar shear strength over a composite containing uncoated fibers. The improvement with carbon coated fibers holds for all concentrations listed of polyvinylidene chloride in the impregnating solution. The data also show an optimum concentration of polyvinylidene chloride near 5 gpl.

Average tensile strength of the carbon coated fibers of this example was 314,000 psi. Average tensile strength of the same fibers prior to coating was 269,000 psi.

EXAMPLE III

Graphitized carbon fibers (HM type) were used to fabricate epoxy resin composites containing approximately 60 percent $V$ to 71 percent $V$ carbon fibers. Interlaminar shear strength of these composites was measured by the short beam method. Results of the measurements are listed in Table II below:

TABLE II

| Carbon Fibers %V | I.L.S.S. psi |
|---|---|
| 59.5 | 7335 |
| 67.6 | 8552 |
| 69.4 | 7288 |
| 71.2 | 5686 |

The same fibers as used above were processed through the apparatus described in Example II. They were impregnated at point C with a solution containing 10 gpl polyacrylonitrile dissolved in dimethylformamide. Prepurified nitrogen was fed into the system at a flow rate of 2,120 ml/min. Temperatures of the ovens were: 1, 240°C.; 2, 270°C.; 3, 220°C.; 4, 465°C.; 5, 940°C. The tow obtained after this treatment was similar to that obtained in Example II.

The carbon coated fibers were used to fabricate epoxy resin composites containing from 62 percent V to 72 percent V fibers. Interlaminar shear strength of these composites, measured by the short beam method, are listed in Table III below.

TABLE III

| Carbon Fibers %V | I.L.S.S. psi |
|---|---|
| 62.4 | 8500 |
| 67.6 | 10310 |
| 71.7 | 9370 |

The above data illustrate that epoxy resin composites fabricated with carbon coated fibers are superior in interlaminar shear strength, to similar composites fabricated with corresponding noncoated fibers. Interlaminar shear strength of carbon fiber — epoxy resin composites are thus more efficiently retained at high fiber concentrations with use of carbon coated fibers than with uncoated fibers.

Average strength of fibers coated with carbon by the process described was 251,000 psi. Average strength of the same fibers prior to coating was 231,000 psi.

EXAMPLE IV

Graphitized carbon fibers (HM type) were impregnated with a solution of polyvinylchloride in methyl ethyl ketone, and processed through a modification of the equipment described in Example II.

Two experiments were made. In one experiment, the concentration of polyvinylchloride in the impregnating solution was 3.5 gpl, and in the second, 10 gpl. Nitrogen was fed into the system at a rate of 2,000 ml/min. Fiber travel rate was 8.1 ft./hr. Temperatures of the heating units were as follows: 3, 220°C.; 4, 460°C.; 5, 935°–940°C. The tow obtained after this treatment was similar to that described in Example II.

Epoxy resin composites were fabricated with fibers from each of the runs, and also with the original untreated fibers. Interlaminar shear strength of each composite was measured by the short beam method. Tensile strength of the treated and untreated fibers was also measured. Results from these measurements are presented in Table IV. Interlaminar shear strength results are normalized to 60 percent by volume graphitized fibers.

TABLE IV

| PVC Conc. gpl | I.L.S.S. psi | Fiber Tensile Strength psi × $10^{-3}$ |
|---|---|---|
| 0 | 11300 | 235 |
| 3.5 | 12400 | 273 |
| 10.0 | 12600 | 275 |

The data show an improvement in interlaminar shear strength, and also in fiber tensile strength after coating fibers with carbon derived from polyvinylchloride.

EXAMPLE V

Graphitized carbon fibers (HM type) were drawn continuously through the equipment described in Example II. Fiber travel rate through the equipment was varied from 5 ft./hr. to 9 ft./hr. Fibers traveled through a solution containing polyvinylidene chloride in hexamethylphosphoramide. Solvent was evaporated in air through the infra-red lamps at (D) and heaters 1 and 2. Fibers then traveled through a continuous Vycor tube heated by the high temperature ovens 3, 4 and 5. They were then collected on a motor driven reel. Temperatures of the heating units were varied as follows:

TABLE V

| Heating Units | Temp. Range, °C. |
|---|---|
| 1 | 60–75 |
| 2 | 145–200 |
| 3 | 210–225 |
| 4 | 380–390 |
| 5 | 800–1150 |

Nitrogen was fed at 2000 ml/min. into the Vycor tube at (J). Air was simultaneously introduced into the nitrogen stream at a fixed rate. Analysis of the nitrogen discharged from the tube showed an oxygen content of 1000 ppm on a volume basis.

A number of runs were made wherein the temperature of Ovens 1 through 4 were in all cases within the range shown in Table V. For each run the temperature of Oven 5 was held at some fixed temperature within the range shown in Table V. For this series of runs the concentration of PVDC in the HMPA solution used was 10 gpl.

Epoxy resin composites were fabricated with fibers from each of the runs, and also with the original untreated fibers. Interlaminar shear strength of each composite was measured by the short beam method. The results from these measurements at 60 percent by volume of graphitized fibers are reported below in Table VI. Tensile strength of the fibers are also reported in Table VI.

TABLE VI

| Temp. °C. | Fiber Tensile Strength psi | Interlaminar Shear Strength psi |
|---|---|---|
| Untreated Fibers | 289,000 | 2,950 |
| 825 | 355,000 | 4,560 |
| 880 | 371,000 | 6,720 |
| 950 | 323,000 | 12,980 |
| 960 | 297,000 | 14,230 |
| 1,010 | 261,000 | 13,300 |
| 1,110 | 260,000 | 9,780 |
| 1,125 | 391,000 | 9,340 |

The data presented in Table VI show that fibers treated as described have improved tensile strength and substantially improved bonding with epoxy resins.

EXAMPLE VI

A number of runs were made wherein carbon fibers (HT type) were drawn through the equipment described in Example II. In these runs the oxygen concentration in the nitrogen atmosphere was varied from 296 ppm (volume bases) to 3140 ppm. In all of the runs, concentration of polyvinylidene chloride in hexamethylphosphoramide was 10 gpl. Temperature of Oven 5 was held at 920°C. Tensile strength of treated fibers and also interlaminar shear strength of epoxy resin composites fabricated with these fibers are listed in Table VII, together with the concentration of oxygen maintained during processing. Tensile strength and interlaminar shear strength obtained with untreated fibers are also included.

TABLE VII

| $O_2$ Concent. ppm, V | Fiber Tensile Strength psi | Interlaminar Shear Strength psi |
| --- | --- | --- |
| Untreated | 275,000 | 4,760 |
| 296 | 267,000 | 5,920 |
| 518 | 366,000 | 10,550 |
| 1,065 | 282,000 | 13,830 |
| 1,485 | 236,000 | 14,100 |
| 1,770 | 266,000 | 13,410 |
| 2,090 | 246,000 | 13,390 |
| 2,410 | 285,000 | 13,720 |
| 2,900 | 244,000 | 13,000 |
| 3,140 | 227,000 | 14,050 |

The data above illustrate the relatively small changes in fiber tensile strength which occur with increase of oxygen concentration after treatment of the fiber by the process described. It also demonstrates the improvement in composite interlaminar shear strength obtained with carbon fibers treated at various oxygen concentration levels.

EXAMPLE VII

Carbon fibers (HT type) were impregnated with a solution containing 5 gpl polyacrylonitrile in dimethylformamide, and processed through a modification of the equipment described in Example II. In the modified equipment, the impregnating solution was moved from point (C) to a position near point (I). The fiber feed reel was moved from point (A) to point (H). Heaters 1 and 2 were not used. Nitrogen containing 1,080 ppm oxygen was fed into the system at a rate of 2000 ml/min. Fiber travel rate was 8.7 ft./hr. Temperatures of the heating units were as follows: 3, 222°C.; 4, 460°C.; 5, 945°C.

An epoxy resin composite was fabricated with the fibers treated as described, and also with the original untreated fibers. Interlaminar shear strength of each composite was measured by the short beam method. Interlaminar shear strength at 60 percent fibers by volume of the composite fabricated with the treated fibers was 13,250 psi, and that of the composite fabricated with the original untreated fibers was 3,410 psi.

EXAMPLE VIII

Carbon fibers (HT type) were impregnated with a solution of asphalt in p-xylene, and processed through a modification of the equipment described in Example II.

The asphalt used was industrial grade material. Its softening point was within the range 185°F. to 200°F. Asphalt concentration in the p-xylene impregnating solution was 20 gpl. Nitrogen was fed into the system at a rate of 2,000 ml/min. Fiber travel rate was 10 ft./hr. Temperatures of the heating units were as follows: 3, 158°C.; 4, 458°C.; 5, 940°C. The tow obtained after this treatment was similar to that described in Example II.

Epoxy resin composites were fabricated with the carbon coated fibers obtained as described above, and also with the original untreated fibers. Interlaminar shear strength of each composite was measured by the short beam method. Tensile strength of the treated and untreated fibers was also measured. Interlaminar shear strength of the composite containing 60 percent by volume of untreated fibers was 3410 psi. Interlaminar shear strength of the corresponding composite containing the carbon coated fibers was 5120 psi. Tensile strengths of untreated and carbon coated fibers were respectively 265,000 psi and 336,000 psi.

EXAMPLE IX

Carbon fibers (HM type) were impregnated with a solution of asphalt in p-xylene, and processed through a modification of the equipment described in Example II.

The asphalt used was industrial grade material. Its softening point ranged from 185°F. to 200°F. Asphalt concentration in the p-xylene impregnating solution was 2.5 gpl. Nitrogen was fed into the system at a rate of 2,000 ml/min. Fiber travel rate was 8.9 ft./hr. Temperatures of the heating units numbered in the sketch were as follows: 3, 167°C.; 4, 447°C.; 5, 940°C. The tow obtained after this treatment was similar to that described in Example II.

Epoxy resin composites were fabricated with the carbon coated fibers obtained as described above, and also with the original untreated fibers. Interlaminar shear strength of each composite was measured by the short beam method. Tensile strength of the treated and untreated fibers was also measured. Interlaminar shear strength of the composite containing 60 percent by volume of untreated fibers was 10,350 psi. Interlaminar shear strength of the corresponding composite containing the carbon coated fibers was 11,360 psi. Tensile strengths of untreated and carbon coated fibers were respectively 287,000 psi and 280,000 psi.

EXAMPLE X

Carbon fibers (HT type) were impregnated with a methyl ethyl ketone solution containing a mixture of epoxy resins and amine hardener. The epoxy resin mixture was composed of 62.5 percent diglycidyl ether of Bisphenol A and 37.5 percent bis(2,3-epoxycyclopentyl) ether. The amine hardener was an eutectic mixture of m-phenylenediamine and methylenedianiline. Epoxy resin and hardener were mixed at a ratio of 100/37 parts by weight before dissolving in methyl ethyl ketone. Concentration of the resin-hardener mixture was 20 gpl. The impregnated fibers were processed through the equipment described in Example II.

Nitrogen was fed into the system at a rate of 2,000 ml/min. Fiber travel rate was 12.4 ft./hr. Temperatures of the heating units were as follows: 1, 97°C.; 2, 92°C.; 3, 222°C.; 4, 460°C.; 5, 940°C. The tow obtained after this treatment was similar to that described in Example II.

Epoxy resin composites were fabricated with the carbon coated fibers obtained as described above, and also with the original untreated fibers. Interlaminar shear strength of each composite was measured by the short beam method. Tensile strength of the treated and untreated fibers was also measured. Interlaminar shear strengths of composites containing 60 percent by volume of untreated and carbon coated fibers were respectively 3410 psi and 5020 psi. Tensile strengths of untreated and carbon coated fibers were respectively 265,000 psi and 316,000 psi.

EXAMPLE XI

Graphitized carbon fibers (HM type) were impregnated with a solution of polyvinylchloride in methyl ethyl ketone, and processed as described in example IV. The concentration of polyvinylchloride in the impregnating solution was 5 gpl. Nitrogen was fed into the system at a rate of 2,000 ml/min. Fiber travel rate was 8.5 ft./hr. Temperatures of the heating units were as set forth in Example IV. The tow obtained after this treatment was similar to that described in Example II.

A composite was prepared by fabricating a vinyl ester resin (the reaction product of approximately equivalent amounts of methacrylic acid and a polyepoxide post-reacted with maleic anhydride, as substantially specified in Example 4 of U.S. Pat. No. 3,564,074), with a portion of impregnated tow described above. For purposes of comparison, a similar composite was fabricated from the original untreated fibers. Interlaminar shear strength of each composite was measured by the short beam method. Concentration of carbon fibers in each composite was calculated from measurement of composite density, carbon fiber density and vinyl ester resin density. The composite prepared from carbon coated carbon fiber contained 51.1 percent by volume of carbon fibers and had an interlaminar shear strength of 7,370 psi. Interlaminar shear strength of this composite normalized to 50 percent by volume carbon fibers was 7,210 psi. The composite prepared from the non-coated carbon fibers contained 48.2 percent by volume carbon fibers and had an interlaminar shear strength of 5,860 psi. Interlaminar shear strength of this composite normalized to 50 percent volume fibers was 6,080 psi. The data illustrate significant increase in interlaminar shear strength with vinyl ester resin composites containing the prescribed carbon coated carbon fibers.

EXAMPLE XII

Graphitized carbon fibers coated with carbon from polyvinylchloride as described in Example XI, were used to prepare a composite using a polyester resin of the type as described in U.S. Pat. No. 2,195,362 and containing 50 percent by weight of monomeric styrene. A similar composite was also made using carbon fibers from the original untreated tow. Interlaminar shear strength of the composites was measured by the short beam method. Fiber content was calculated from the composite density and the density of each component of the composite. The composite prepared with carbon coated fibers contained 46 percent by volume carbon fibers, and had an interlaminar shear strength of 5510 psi. Interlaminar shear strength of this composite normalized to 50 percent by volume fibers was 6,000 psi. The composite prepared from uncoated fibers had a fiber concentration of 46.5 percent by volume, and an interlaminar shear strength of 4,890 psi. Interlaminar shear strength of this composite normalized to 50 percent by volume fibers was 5,260 psi. The data illustrate that significantly improved interlaminar shear strength of polyester-carbon fiber composites is obtained using carbon fibers previously coated with amorphous carbon.

What is claimed is:

1. A composite material comprising a polyester resin matrix containing a plurality of flexible carbon fibers said fibers having a Young's modulus parallel to the fiber axis of at least about $12 \times 10^6$ pounds per square inch and the surface of said fiber being coated with an essentially continuous coating of amorphous carbon, said coating having a thickness of from about 20A to about 200A and being obtained by deposition of a thermally carbonizable organic precursor onto the carbon fiber said organic precursor being thermally carbonized to amorphous form at temperatures less than 1,200°C.

2. A composite material comprising a vinyl ester resin matrix containing a plurality of flexible carbon fibers said fibers having a Young's modulus parallel to the fiber axis of at least about $12 \times 10^6$ pounds per square inch and the surface of said fiber being coated with an essentially continuous coating of amorphous carbon, said coating having a thickness of from about 20A to about 200A and being obtained by deposition of a thermally carbonizable organic precursor onto the carbon fiber said organic precursor being thermally carbonized to amorphous form at temperatures less than 1,200°C.

* * * * *